Nov. 29, 1960 G. A. MORTHLAND 2,962,405
LAMINATED SHEET MATERIAL
Filed May 7, 1956 2 Sheets-Sheet 1
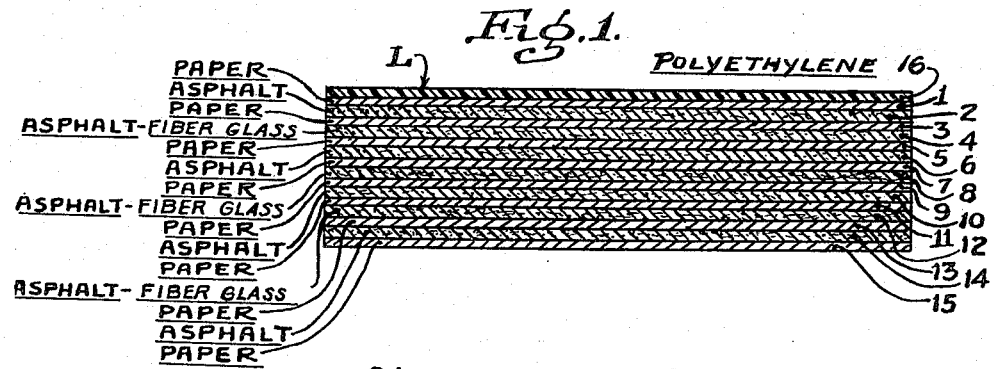
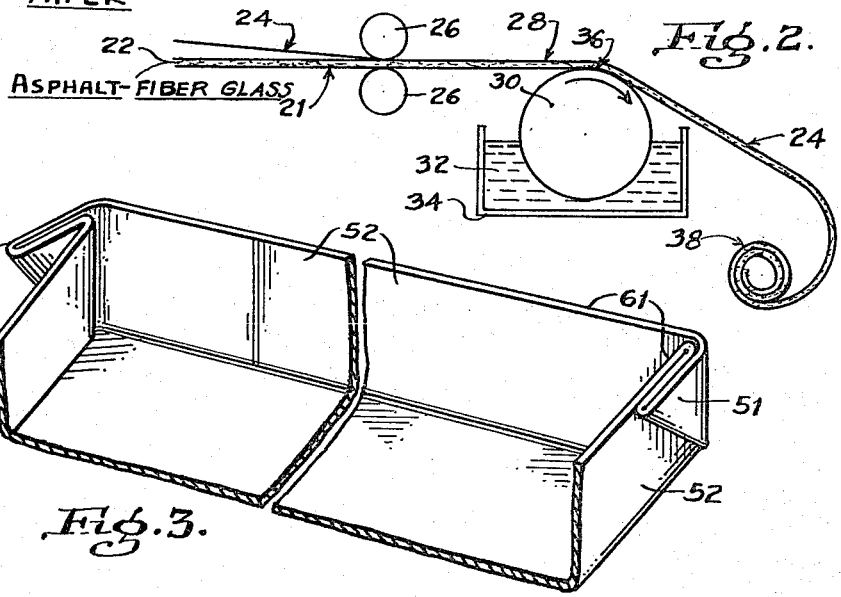
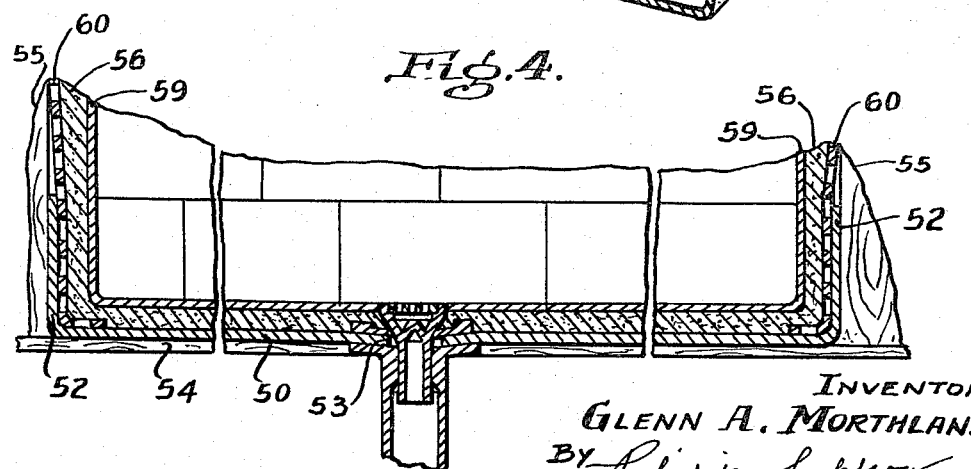
INVENTOR
GLENN A. MORTHLAND
BY Philip Subrow
ATTORNEY.

Nov. 29, 1960 G. A. MORTHLAND 2,962,405
LAMINATED SHEET MATERIAL
Filed May 7, 1956 2 Sheets-Sheet 2

INVENTOR.
GLENN A. MORTHLAND
BY Philip Sutkow
ATTORNEY.

United States Patent Office 2,962,405
Patented Nov. 29, 1960

2,962,405

LAMINATED SHEET MATERIAL

Glenn A. Morthland, Pasadena, Calif.
(355 Glendale Blvd., Los Angeles 26, Calif.)

Filed May 7, 1956, Ser. No. 583,230

16 Claims. (Cl. 154—51)

This invention relates to a laminated paper product, and to a shower pan construction formed from such paper laminate.

This application is a continuation-in-part of my copending U.S. application Serial No. 412,985, filed March 1, 1954, now abandoned.

In my application Serial No. 308,737, filed September 10, 1952, now abandoned, there is disclosed a shower pan formed of a plurality of layers of paper with laminations of glass fiber saturated with asphalt between the papers. The asphalt forms a bond between the papers in the form of a continuous layer of asphalt between the sheets of paper, said asphalt layer containing strands of glass fibers which form a mat or batt of considerable strength, to give to the inherently weak asphalt and paper structure a strength of surprising magnitude.

In my application Serial No. 412,985 is disclosed and claimed a laminated paper sheet particularly useful for fabrication of a shower pan construction, said sheet having the basic structure of the paper sheet of my application Serial No. 308,737, but including in combination therewith means in the form of a thin flexible water-impermeable covering, preferably a flexible plastic sheet, bonded or laminated to at least one of the outer paper sheets of the paper-asphalt and fiber glass laminate. Said thin flexible film bonded to the surface of an outer paper sheet renders the entire laminated paper sheet more impervious to absorption of water and protects the underlying papers of the laminate from absorption of water in weakened areas thereof, especially in the vicinity of ridges formed in said papers by stresses due to flexing or bending of the laminate or shower pan structure formed therefrom.

While the laminated sheet structures of my above mentioned applications have generally proved successful in the fabrication of shower pan structures, the thickness of the laminated sheet in these structures is essentially limited to a laminate having three asphalt bonding layers, four paper sheets and one or two outer plastic sheets, as disclosed in the above noted applications, since difficulty in bending the laminated sheet to form a shower pan construction is encountered if more than the above noted number of lamination layers is employed. However, it is of course advantageous to employ a laminated sheet having more than three asphalt layers and more than four paper sheets, if possible, to increase the strength, water impermeability and durability of the shower pan structure produced from the paper-asphalt laminate, provided at the same time such a laminate of increased thickness can be readily folded to form the shower pan construction. A paper-asphalt laminate of such increased thickness and number of laminations, and having proper folding characteristics for use in fabricating shower pan structures has heretofore been unkown to the art.

Further, it has been found that shower pan structures, including those of my copending applications, have a tendency to deteriorate particularly along the edge of the hole forming the drain opening after a period of use. This deterioration tends to permit water to permeate from the edge of the drain hole into and between the layers of the paper laminate forming the shower pan structure and to weaken said structure, thus posing an annoying problem.

A particular object of the invention is the provision of a laminated sheet structure and shower pan construction formed of laminated paper sheets with intermediate layers of asphalt and/or of asphalt and glass fibers, having greater thickness, strength and water impermeability than prior art structures of this general type, yet having substantial flexibility, enabling folding of the sheet laminate without cracking and rupture of the laminate.

Another object is to provide a laminated sheet and shower pan structure having the foregoing properties, and which is also resistant to disintegration by water along the exposed cut edges of the sheet, particularly at the drain opening formed in the shower pan structure.

The above and additional objects of the invention are accomplished by provision of the novel laminated sheet structure and shower pan construction of the invention.

I have designed a paper laminate of the general type disclosed in my above copending applications, that is, formed of asphalt bonding layers, and particularly a combination of asphalt and asphalt-fiber glass bonding layers, but which is constructed of substantially more layers of lamination and is thus thicker, heavier, stronger, and less permeable to water than the laminates of my above applications, yet sufficiently ductile and pliable to be folded into a box or shower pan construction with corner box folds, by treatment of the laminate in the manner described below. The sheet laminate of increased thickness of this invention, used in making the shower pan, may be folded and refolded a large number of times at freezing temperature without cracking of the sheet, and thus may be installed without warming up the shower pan.

The laminated sheet material and shower pan of the invention are preferably formed of a plurality of layers of paper with laminations of glass fiber saturated with asphalt, and laminations of asphalt alone, between the papers, the laminate being impregnated or saturated with a gas oil or lubricating oil fraction containing a minor, but preferably substantial, proportion of polybutylenes. The impregnation of the laminate by such oil composition greatly enhances the pliability and flexibility of the laminated sheet, even though substantially more layers of asphalt bonding and paper sheets are employed than in the laminates of my above noted applications.

As an additional feature of the invention I have found that by incorporating into the above noted oil composition a minor amount of a material which prevents fungus growth, most desirably pentachlorophenol, deterioration of the laminated sheet or shower pan along its edges, and particularly at the edge about the drain hole formed in the shower pan structure, is greatly reduced, and the useful life and efficiency of the shower pan materially increased.

These and other features of my invention will be further described particularly in connection with the accompanying drawings wherein:

Fig. 1 is a schematic cross section of a paper laminate according to the invention;

Fig. 2 illustrates a step in a procedure for preparing the laminated sheet structure of the invention;

Fig. 3 shows a fragmentary perspective view of the method of folding the sheet to form a shower pan;

Fig. 4 is a section of the shower stall showing the pan installed;

Figure 5:
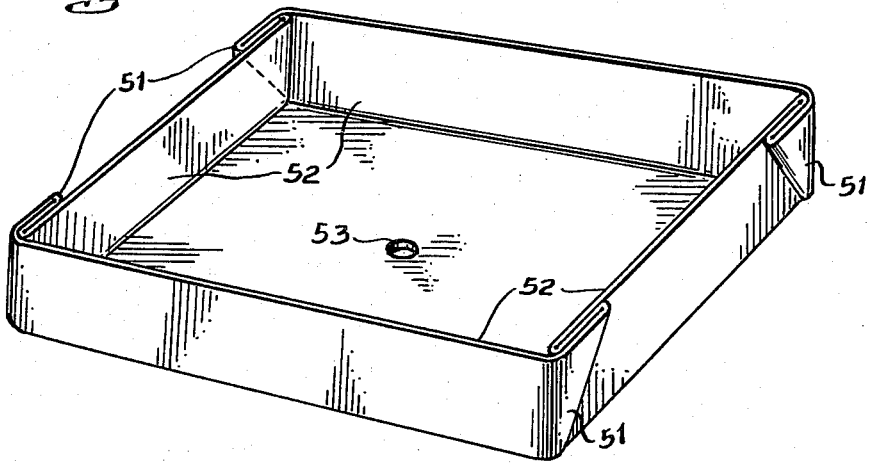
Fig. 5 is a perspective view of a shower pan made using the laminated sheet structure of the invention.

Referring now to the drawing representing a preferred embodiment of the invention, the shower pan thereof can be formed by folding the laminated material of the invention into a box in a manner to be described more fully below. The laminated material L illustrated in Fig. 1 is formed of eight sheets of paper bonded together by seven asphalt layers, three of which have fiber glass distributed therein. A flexible, e.g. "pliofilm," sheet may be bonded to an outside paper sheet of the laminate. "Pliofilm" is a chlorinated rubber heat sealable composition. Thus, as shown in Fig. 1, this laminate is composed of paper sheets 1, 3, 5, 7, 9, 11, 13 and 15. Between sheets 1 and 3 is an asphalt layer 2, between sheets 3 and 5 an asphalt-fiber glass layer 4, between sheets 5 and 7 an asphalt layer 6, between sheets 7 and 9 an asphalt-fiber glass layer 8, between sheets 9 and 11 an asphalt layer 10, between sheets 11 and 13 an asphalt-fiber glass layer 12, and between sheets 13 and 15 an asphalt layer 14. To sheet 14 is bonded a "pliofilm" sheet 16. The laminate is impregnated with the oil composition noted above, with or without the fungus preventing agent.

There is thus formed a thick, strong, highly impermeable, yet flexible laminated sheet, each sheet of paper of the laminate being separated from the adjacent sheet of paper by a layer of asphalt, or of asphalt and fiber glass, said paper sheets being impregnated with an oil according to the invention, rendering the laminate very pliable. The asphalt bonds the glass fibers in a mat form in those bonding layers containing such fibers, and adhesively bonds the adjacent paper sheets. While the above described laminate and shower pan structure constitutes a preferred embodiment, I may, of course, reduce or increase the number of paper layers, and reduce or increase the number of asphalt or asphalt-fiber glass bonding layers.

The paper should preferably be of a strong and desirable paper stock; as, for example, 20 to 100 lb. kraft, with 20, 30 and 70 lb. kraft paper as the preferred weights, and may be replaced by various other parting membranes which will make a suitable adhesive bond with the asphalt and be readily impregnated with the oil composition, and which may, if desired, also impart to the asphalt bonded sheet tensile, shear and tear strength. Because of its cheapness and particular adaptability to this use, paper is the preferred parting material to separate the asphalt and to form a sheet of material of the properties described herein. The tear strength of the paper is a useful property, but since the fiber glass imparts such a high degree of strength, the strength of the paper or parting membrane is of lesser importance.

Asphalt is employed here to act as a bonding and laminating material for the paper and to form a bonding material for the fiber glass and parting and covering sheets. Asphalt is a cheap thermoplastic material which in this use exhibits a high adhesive strength to bond the various sheets of paper together and to bond the glass fibers. It has excellent water resistant and repellent properties when used in the shower pan of my invention. The laminated paper- glass fibers-asphalt bonded sheet employed in my shower pan has low water absorption properties.

I employ the asphalt in thin layers, just sufficient to cover the glass fibers and coat the papers. The glass fibers are preferably of length, for example, from 3 to 6 inches, as shown at 7' in Fig. 6, rather than the chopped, short length fibers.

Figure 6:
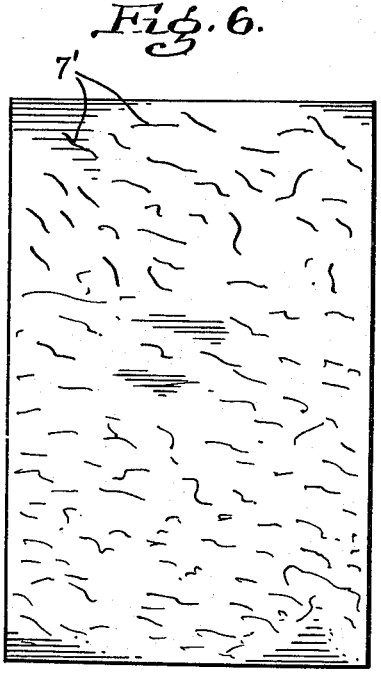
Figs. 6 and 7 each show in schematic form alternative methods of orientation of the glass fibers in certain of the asphalt bonding layers of the sheet structure hereof.

The fibers may be laid down in random orientation, using one layer of fibers and the paper coated with asphalt. The overlying paper may then be placed on the sheet and this process repeated until the number of layers described above is obtained. Fig. 6 is merely illustrative and it will be understood that the lamina of asphalt are filled with fibers and thus a mat of fibers substantially one fiber thick is bonded together with the asphalt and bonded to the overlying and underlying paper. The fibers cover substantially the entire surface of said paper and asphalt sheets.

Instead of the random orientation of fibers, continuous fibers 8' (see Fig. 7) may be laid longitudinally of the paper in somewhat random distribution, all extending along the length of the sheet from one edge to the opposing edge of the sheet used to form the shower pan, and overlay or are interwoven with continuous fibers extending across the width of the said sheet in random orientation, but all extending across the width of the sheet. The asphalt binds these fibers in the manner described. Continuous fibers extend across the width of the sheet substantially from one edge to the other parallel edge of the paper and also in a direction generally perpendicular to the exterior of the first mentioned fibers and between the edges of the sheet which are perpendicular to the first mentioned parallel edges of the square sheet to be formed into a shower pan.

Figure 7:
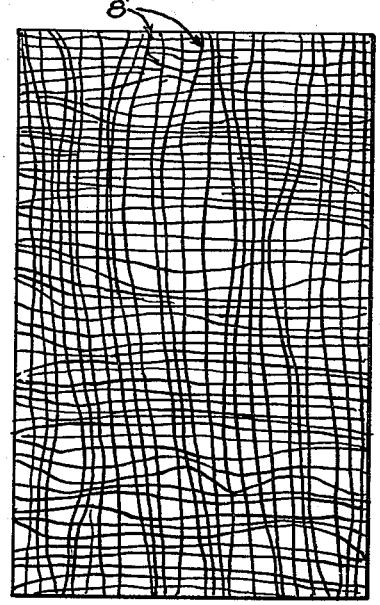

It will be understood that Fig. 7 is merely illustrative and that the fibers are closely spaced and fill the asphalt sheet, covering substantially the entire surface of said paper and asphalt sheets in an interwoven orientation as described above.

While I have referred to the orientation of the fibers as interwoven, I do no means or imply that the fibers are in such case interlaced in a regular weave, but that the fibers may be intertwined, the longitudinal fibers and the cross fibers passing under and over adjacent fibers in a loose inter-weave.

Preferably, the longitudinal fibers or the cross fibers are laid first and then the other fibers, i.e., the cross fibers, are laid over the longitudinal fibers or the longitudinal fibers over the cross fibers, depending upon which sequence is followed. In both these cases, i.e., where the fibers are laid in random orientation and do not individually extend from edge to edge and in the case where the fibers do extend from edge to edge of the sheet from which the pan is formed, a mat is created which is essentially one fiber thick, except, of course, at the crossing or contact points of the fibers where they cross each other.

The laminated sheet structure illustrated in Fig. 1 is preferably produced by the following procedure, reference being made particularly to Fig. 2. A 20 lb. kraft paper sheet, indicated by numeral 21 is coated with a layer 22 of glass fibers saturated with asphalt as described above, such glass fibers being either in random orientation as illustrated in Fig. 6, or as essentially continuous overlying fibers extending along the length and width of the sheet as illustrated in Fig. 7. Sheet 21 and another sheet 24 of 20 lb. kraft paper are passed between a pair of adjacent rollers 26, with the asphalt-fiber glass layer disposed between sheets 21 and 24. Sheets 21 and 24 are thus bonded together to form a laminated sheet 28 composed of two 20 lb. kraft paper outer layers and an intermediate layer of asphalt and fiber glass.

Sheet 28 is then passed over a rotatable roll 20 which dips into an oil composition 32 in a receptacle 34 as the roll rotates, thus coating the lower paper sheet 21 of the laminate 28 with the oil, as said lower sheet 21 makes contact with the surface of roll 30 at 36. The oil 32 with which the laminate 28 is saturated is preferably a gas oil or lubricating oil fraction containing a minor portion of a resinous material consisting of polybutylenes, preferably having a molecular weight of between about 10,000 and about 12,000. The resinous content of the oil raises the viscosity of the oil, giving it greater body, and facilitates impregnation of the oil into the sheet. The resinous content of the oil also has the beneficial effect of introducing high molecular weight material into the paper, and in plasticizing the laminate. The amount of polybutylenes incorporated in the oil may vary depending on the viscosity of the oil desired. I prefer to employ an amount of about 10% of such polybutylenes in the oil impregnating composition contained in vessel 34. However, it will be understood that the proportion of polybutylenes can vary. Thus, for example, I may use from about 5% to about 15% polybutylenes by weight of the oil composition.

Also, as an additional feature of the invention, I preferably add to the oil composition a minor amount of a material for control of fungus growth. Preferably I employ pentachlorophenol for this purpose, but it will be understood that other equivalent materials can be employed. The proportion of this latter material which I have found particularly suitable is about 2% by weight of the oil composition, although larger or smaller quantities of the fungus control agent as desired, can be employed. Such agent prevents deterioration of my laminate and shower pan structure by water, particularly at the edges of the laminate. However, it will be understood that I can omit the fungus control agent from the oil composition if I so desire.

After passing over roll 30 to coat the lower paper sheet 21 of laminate 28 with the oil composition 32, said laminate is rolled upon itself at 38 to cause the inner oil saturated sheet 21 of the laminate to overlie the outer sheet 24 of the laminate, to thus impregnate both outer paper sheets of laminate 28 with the oil composition. Laminate 28 is then cut into three substantially equal lengths and these portions treated as described below.

Two sheets of laminate 28 are then bonded together with an intermediate layer of asphalt 6 (see Fig. 1), the resulting laminate thus making up layers 3 through 9 of laminate L of Fig. 1. Said resulting laminate is then bonded on its outer paper sheet 3 to a 30 lb. kraft paper sheet 1 by means of an asphalt layer 2, the laminate thus produced now consisting of layers 1 to 9 of laminate L illustrated in Fig. 1.

The laminate formed of layers 1 to 9 is then bonded on its outer paper sheet 9 by means of an asphalt layer 10, to the third cut sheet of laminate 28, which includes two 20 lb. kraft paper sheets 11 and 13 having an intermediate bonding layer 12 of asphalt and fiber glass. To paper sheet 13 of the resulting laminate, now making up layers 1 to 13 of the laminate L, is bonded an outer 70 lb. kraft paper sheet 15, by means of an intermediate asphalt bonding layer 14. The laminate thus formed is composed of layers 1 through 15 of the laminate structure L of Fig. 1, and may be employed as such for construction of a shower pan by folding, e.g. in the manner described in detail hereinafter.

It will be seen that the sheet laminate composed of layers 1 through 15, formed as described above, is impregnated with a substantial amount of the oil composition hereof. However, it will be noted in the embodiment above described that only the intermediate paper sheets 3, 5, 7, 9, 11 and 13, corresponding to the outer paper sheets 21 and 24 of the laminate 28, are actually impregnated with oil, while the two outer 30 lb. and 70 lb. paper sheets 1 and 15 are not so impregnated. Thus, it will be understood that only some and not all of the paper sheets of my laminate need be impregnated with the oil composition, while still realizing to a greater or lesser degree the advantages of my invention, and preferably the two outer sheets are not so impregnated in order to reduce the tackiness of the outer paper sheets and render the laminate of the invention easier to handle. However, preferably a majority of the paper sheets of my laminate are impregnated with the oil composition hereof, and if desired, all of the paper sheets of my laminate may be impregnated with the oil composition, including the outer paper cover sheets.

In some instances, a "pliofilm" or other suitable heat sealable flexible thermoplastic sheet, such as polyethylene, cellulose, acetate, cellulose acetate-butyrate, "cellophane" (regenerated cellulose) treated to render it water impermeable, and the like, is secured as illustrated at 16 in Fig. 1, on the outer surface of the upper 30 lb. paper sheet 1 of the laminate composed of layers 1 to 15. This can be accomplished by positioning the plastic sheet 16 over paper sheet 1, prior to its being bonded to paper sheet 3 of the laminate as described above, and subjecting the sheets 1 and 16 to the action of heated pressure rolls to cause the plastic to flow and to thus bond the thermoplastic film 16 to paper sheet 1. Alternatively, the plastic sheet may be bonded to the laminate by means of a water-impermeable cement such as asphalt. The paper sheet 1 of the resulting laminate consisting of sheets 1 and 16 is then impregnated with the oil composition noted above by passing paper sheet 1 of said laminate over a roll such as 30 which dips into the oil. The oil does not impregnate the plastic sheet 16. The resulting laminate made up of sheets 1 and 16 is then bonded on the paper sheet side 1 by means of asphalt layer 2, to the paper sheet 3 of the above noted laminate consisting of layers 3 to 9, and the laminate thus produced is treated in the manner described above to add layers 10 to 15 to such laminate to produce the final laminate designated L in Fig. 1.

I may also utilize in place of a plastic sheet 16, a corrosion resistant metal foil, e.g., stainless steel foil, as a flexible water-impermeable covering member to be applied to the paper surface of my shower pan structure. Such foil may be bonded to the paper by means of a suitable cement.

The thin covering layer 16, e.g. of "pliofilm" or polyethylene plastic, protects any weakened portions of the upper paper sheet 1 to which it is bonded, particularly in the vicinity of ridges formed near the box folds of the shower pan structure, which ridges may be formed in sheet 1 by accidentally bending or similarly stressing the shower pan structure. The thickness of such plastic cover sheet may be on the order, for example, of about .005 inch.

It will be understood that the above described procedure for fabricating my sheet laminate impregnated with the oil composition is intended as illustrative only, and that other modes of procedure may be practiced to obtain my oil impregnated laminated sheet structure.

As an example of the character and composition of my flexible laminated sheet, without intending thereby to limit my invention, the laminate L described above has seven layers of asphalt, amounting to a total of .28 lb. asphalt per sq. ft. of laminate, the asphalt in each layer amounting to .04 lb./sq. ft. The six inner sheets of 20 lb. kraft paper of which the laminate L is composed, have a total weight of .04 lb./sq. ft. of laminate, and the 30 and 70 lb. kraft outer paper layers together amount to .033 lb. per sq. ft., making a total weight of paper of .073 lb./sq. ft. of laminate. The total weight of fiber glass in the three asphalt bonding layers 4, 8 and 12 of laminate L, is .003 lb./sq. ft., there being .001 lb./sq. ft. in each such layer. Thus, the total weight of laminate L, excluding the thermoplastic upper sheet 16, is about .356 lb./sq. ft., of which .280 lb. is asphalt. Thus, it will be seen that the percentage of asphalt in the laminate, excluding the outer thermoplastic sheet, is about 80%. In comparison, the total weight of the laminate of my copending application Serial No. 412,985, having three asphalt-fiber glass layers and four paper sheets was about .2 lb./sq. ft., excluding the plastic cover sheet, and the total percentage of asphalt in such laminate was about 60%.

Thus, it will be seen that the laminate of the instant invention, excluding the weight of the outer plastic cover layer and the oil impregnated into the laminate carries a substantially greater percentage of asphalt than the laminate of my copending application, and hence the laminate of the instant invention is substantially more water-impermeable than the sheet laminate and shower pan structure of my copending application.

Further, the thickness of the laminate of the invention including the plastic cover sheet 16, can be about .080 inch or more, in comparison to the laminate of my application Serial No. 412,985, illustrated in one embodiment as about .055 inch. Thus, while the laminate of the instant invention is of substantially greater thickness than that of my copending application, due to the impregnation of the laminate hereof with an oil composition according to the invention, the laminate hereof is sufficiently resilient to permit bending thereof into a shower pan structure even under cold weather conditions without cracking of the sheet. The amount of oil with which my laminate is impregnated may be varied depending on the number of laminations or layers of paper in the laminate and the degree of flexibility desired to be imparted to the laminated sheet. Thus, for example, the laminate L of Fig. 1 may be impregnated with from about .003 to about .008 lb., say .005 lb., of the oil composition per sq. ft. of laminate.

The above figures are given for purposes of indicating the order of magnitude of the proportions of the components of the laminated sheet. The specification of proportions and dimensions may be varied from the specific proportions to obtain variations in specific values of the properties of the laminated sheet without departing from the substance of the invention which is described and claimed herein.

Since the ductility and resistance to cracking on folding of the laminated sheet hereof is high, the laminated assembly hereof is rendered particularly applicable to the construction of shower pans. The flexibility and ductility of my laminate are important since movement of the house or structure in which the shower pan is installed, due to settling or earthquakes, especially when the temperature drops to a relatively lower temperature below about 50° F., may cause the brittle and relatively weak asphalt pan of the prior art to crack, thus producing a leaky pan. The great tensile strength and ductility of the shower pan of my present invention will thus withstand temperatures and movement which the prior art pan will not withstand.

The use of my oil composition for impregnating the paper sheets of my laminate renders the individual fibers of the paper sheets unusually pliable, and enables them to bend and slide easily, so as to permit the entire sheet laminate, composed of a substantial number of paper sheet layers according to the invention, to be readily bent into corner box folds substantially without cracking in fabricating the shower pan construction hereof.

The laminated sheet material of the invention impregnated with the above described oil composition is generally formed into rolls. Sheets of the desired dimensions are cut from these rolls, e.g. for the purpose of fabricating a shower pan structure therefrom.

In forming the shower pan the sheet is bent to form four upstanding sides 52 of the box by means of box-folds 51. A hole 53 is formed centrally of the base 50 of the shower pan. The shower pan is set on the subfloor 54 with the sides 52 against the walls 55 of the shower stall. Metal lath 60 is placed over the pan and plastered or cemented as usual to give a coating 56. The drain filter is set through the hole 53 and the stall tiled, as at 59, in the conventional manner. It will be noted that the use of a fungus preventive agent such as pentachlorophenol prevents distintegration of the laminate about the edges of the drain hole 53 of the shower pan, and the upper edges 61 thereof. This increases the life and efficiency of the pan, and prevents ingress of water between the laminations of the shower pan structure, such water entering the laminations otherwise tending to bring about separation of the layers of lamination.

Any other form of construction, as, for example, that shown in my Patent No. 2,484,240, issued October 11, 1949, or any other form of shower stall construction may be used. In each the advantages of the shower pan of this application will be found highly useful.

While I have disclosed asphalt as a preferred material, I may use other weatherproof adhesive materials, such as thermoplastic or even thermosetting resins, either natural or synthetic, as for example, coal tar pitch and the synthetic water impermeable thermoplastic or thermosetting laminating resins in place thereof.

Further, although I have shown and described a laminated sheet or shower pan construction wherein the outer surface of only one of the two outer paper sheets thereof is sealed with a water-impermeable, flexible, preferably plastic covering, such covering may be applied to the outer surface of both outer sheets, e.g., sheets 1 and 15 in the embodiment of Fig. 1 hereof, if desired, in order to provide added protection for the invention structure from undesired absorption of water in accordance with the herein described principles.

The term "consisting essentially of" as used in the definition of the ingredients present in the composition of the claimed article is intended to exclude the presence of other materials in such amounts as to interfere substantially with the properties and characteristics possessed by the composition set forth but to permit the presence of other materials in such amounts as not substantially to affect said properties and characteristics adversely.

While I have described a particular embodiment of my invention for the purpose of illustration, it should be understood that various modifications and adaptations thereof may be made within the spirit of the invention as set forth in the appended claims.

I claim:

1. A flexible laminated sheet structure sufficiently flexible to be formed into desired shapes, which comprises laminated paper sheets having intermediate layers of asphalt and thin compact layers of glass fibers bonded by asphalt, said asphalt adhesively bonding said paper sheets, at least some of said paper sheets being impregnated with an oil composition consisting essentially of a member of the group consisting of a gas oil and a lubricating oil fraction, and a minor proportion of polybutylenes, said composition combining with said asphalt to impart the desired degree of flexibility to said sheet structure.

2. A flexible laminated sheet as defined in claim 1, wherein said oil composition includes a minor amount of pentachlorophenol.

3. A flexible laminated sheet structure sufficiently flexible to be formed into desired shapes, which comprises a substantial number of sheets of paper connected together by layers of asphalt, at least some of said paper sheets being laminated to a mat of glass fibers covering substantially the entire surface of said last named sheets and bonded together by said asphalt, each of said asphalt bonded mats being adhesively held by said asphalt to two sheets of paper to form a laminated sheet composed of the asphalt, glass fibers and paper sheets, at least a majority of said paper sheets being impregnated with an oil composition consisting essentially of a member of the group consisting of a gas oil and a lubricating oil fraction, and a minor but substantial proportion of polybutylenes, said composition combining with said asphalt to impart the desired degree of flexibility to said sheet structure.

4. A flexible paper laminate sufficiently flexible to be formed into a shower pan, which comprises eight sheets of paper cemented together by seven intermediate layers of asphalt, some of said asphalt layers including a mat of glass fibers bonded together by said asphalt, each of said asphalt bonded mats being adhesively held by said asphalt to two sheets of paper to form a laminated sheet composed of the asphalt, glass fibers and paper sheets, a majority of the intermediate sheets of said laminate being impregnated with an oil composition consisting essentially of a member of the group consisting of a gas oil and a lubricating oil fraction, and a minor but substantial proportion of polybutylenes, said composition combining with said asphalt to impart the desired degree of flexibility to said paper laminate.

5. A sheet material sufficiently flexible to be formed in desired shapes, comprising multiple layers of paper sheets laminated by intermediate asphalt layers, at least some of said paper sheets being impregnated with a composition consisting essentially of an oil of the group consisting of a gas oil and a lubricating oil fraction, and a minor portion of polybutylene, said composition combining with said asphalt to impart the desired degree of flexibility to said sheet material.

6. A sheet material sufficiently flexible over a wide temperature range to be formed in desired shapes, comprising multiple layers of paper sheets laminated by intermediate asphalt layers at least some of which contain glass fibers, a majority of said paper sheets being impregnated with a composition consisting essentially of an oil of the group consisting of a gas oil and a lubricating oil fraction, and a minor portion of polybutylene, said composition combining with said asphalt to impart the desired degree of flexibility to said sheet material.

7. A laminated sheet material sufficiently flexible to be formed in desired shapes, comprising a plurality of layers of paper sheets bonded together by asphalt layers disposed between adjacent sheets, at least some of said paper sheets being impregnated with a mixture of a minor portion of polybutylene in an oil, said mixture rendering the fibers of the paper sheets pliable and enabling them to bend and slide easily.

8. A laminated sheet material sufficiently flexible to be formed in desired shapes, comprising a plurality of layers of paper sheets bonded together by asphalt layers disposed between adjacent sheets, at least some of said asphalt layers containing a mat of glass fibers, a majority of said paper sheets being impregnated with a mixture of a minor portion of polybutylene in an oil, said mixture rendering the fibers of the paper sheets pliable and enabling them to bend and slide easily.

9. A flexible laminated sheet structure sufficiently flexible to be formed into desired shapes, which comprises laminated paper sheets having intermediate layers of asphalt and thin compact layers of glass fibers bonded by asphalt, said asphalt adhesively bonding said paper sheets, at least some of said paper sheets being impregnated with an oil composition consisting essentially of a member of the group consisting of a gas oil and a lubricating oil fraction, and from about 5% to about 15% of polybutylenes by weight of said oil composition, said polybutylenes having a molecular weight of between about 10,000 and about 12,000, said composition combining with said asphalt to impart the desired degree of flexibility to said sheet structure.

10. A flexible laminated sheet structure as defined in claim 1, said sheet structure including at least eight paper sheets, and wherein said oil composition includes a minor amount of a fungus growth preventing material.

11. A flexible laminated sheet structure sufficiently flexible to be formed into desired shapes, which comprises a substantial number of sheets of paper connected together by layers of asphalt, at least some of said paper sheets being laminated to a mat of glass fibers covering substantially the entire surface of said last named sheets and bonded together by said asphalt, each of said asphalt bonded mats being adhesively held by said asphalt to two sheets of paper to form a laminated sheet composed of the asphalt, glass fibers and paper sheets, at least a majority of said paper sheets being impregnated with an oil composition consisting essentially of a member of the group consisting of a gas oil and a lubricating oil fraction, and a minor but substantial proportion of polybutylenes, said composition combining with said asphalt to impart the desired degree of flexibility to said sheet structure, said oil composition including about 2% by weight of pentachlorophenol, the polybutylenes being present in a proportion of about 10% by weight of said oil composition, and said polybutylenes having a molecular weight of between about 10,000 and about 12,000.

12. A flexible paper laminate sufficiently flexible to be formed into a shower pan, which comprises eight sheets of paper cemented together by seven intermediate layers of asphalt, some of said asphalt layers including a mat of glass fibers bonded together by said asphalt, each of said asphalt bonded mats being adhesively held by said asphalt to two sheets of paper to form a laminated sheet composed of the asphalt, glass fibers and paper sheets, a majority of the intermediate sheets of said laminate being impregnated with an oil composition consisting essentially of a member of the group consisting of a gas oil and a lubricating oil fraction, and a minor but substantial proportion of polybutylenes, said composition combining with said asphalt to impart the desired degree of flexibility to said paper laminate, said oil composition including about 2% by weight of pentachlorophenol, the polybutylenes being present in a proportion of about 10% by weight of said oil composition, said polybutylenes having a molecular weight of between about 10,000 and about 12,000, there being three asphalt bonding layers including said glass fibers.

13. A laminated sheet material sufficiently flexible to be formed in desired shapes, comprising a plurality of layers of paper sheets bonded together by asphalt layers disposed between adjacent sheets, at least some of said paper sheets being impregnated with a mixture of a minor portion of polybutylene in an oil, said oil mixture containing from about 5% to about 15% by weight of said polybutylene, said mixture rendering the fibers of the paper sheets pliable and enabling them to bend and slide easily.

14. A laminated sheet material sufficiently flexible to be formed in desired shapes, comprising a plurality of layers of paper sheets bonded together by asphalt layers disposed between adjacent sheets, at least some of said paper sheets being impregnated with a mixture of a minor portion of polybutylene in an oil, said oil mixture containing from about 5% to about 15% by weight of said polybutylene, said polybutylene having a molecular weight of between about 10,000 and about 12,000, said mixture rendering the fibers of the paper sheets pliable and enabling them to bend and slide easily.

15. A sheet material sufficiently flexible to be formed in desired shapes, comprising multiple layers of paper sheets laminated by intermediate asphalt layers, at least some of said paper sheets being impregnated with a composition consisting essentially of an oil of the group consisting of a gas oil and a lubricating oil fraction, and a minor portion of polybutylene, said composition containing from about 5% to about 15% by weight of said polybutylene, said composition combining with said asphalt to impart the desired degree of flexibility to said sheet material.

16. A sheet material sufficiently flexible to be formed in desired shapes, comprising multiple layers of paper sheets laminated by intermediate asphalt layers, at least some of said paper sheets being impregnated with a composition consisting essentially of an oil of the group consisting of a gas oil and a lubricating oil fraction, and a minor portion of polybutylene, said composition containing from about 5% to about 15% by weight of said polybutylene, said polybutylene having a molecular weight of between about 10,000 and about 12,000, said composition combining with said asphalt to impart the desired degree of flexibility to said sheet material.

References Cited in the file of this patent

UNITED STATES PATENTS

| | | | |
|---|---|---|---|
| 921,001 | Roberts | May 11, | 1909 |
| 1,845,655 | Fuchs | Feb. 16, | 1932 |
| 2,051,840 | Gerhart | Aug. 25, | 1936 |
| 2,061,570 | Frolich | Nov. 24, | 1936 |
| 2,239,969 | Morthland | Apr. 29, | 1941 |
| 2,513,708 | Belcher | July 4, | 1950 |
| 2,523,759 | Grant | Sept. 26, | 1950 |
| 2,525,788 | Fontana et al. | Oct. 17, | 1950 |
| 2,652,351 | Gerhardt | Sept. 15, | 1953 |
| 2,695,854 | Mullen | Nov. 30, | 1954 |
| 2,714,771 | Olfene | Aug. 9, | 1955 |

FOREIGN PATENTS

| | | | |
|---|---|---|---|
| 817,841 | France | May 31, | 1937 |
| 621,867 | Great Britain | Apr. 21, | 1949 |
| 148,830 | Australia | Aug. 30, | 1951 |